United States Patent
Boesch et al.

(10) Patent No.: US 10,336,254 B2
(45) Date of Patent: Jul. 2, 2019

(54) CAMERA ASSISTED VEHICLE LAMP DIAGNOSIS VIA VEHICLE-TO-VEHICLE COMMUNICATION

(71) Applicant: Ford Global Technologies, LLC, Dearborn, MI (US)

(72) Inventors: Mathew A. Boesch, Plymouth, MI (US); Daniel A. Makled, Dearborn, MI (US); Michael McQuillen, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 15/494,380

(22) Filed: Apr. 21, 2017

(65) Prior Publication Data
US 2018/0304807 A1    Oct. 25, 2018

(51) Int. Cl.
*B60Q 11/00*   (2006.01)
*G06K 9/00*    (2006.01)
(Continued)

(52) U.S. Cl.
CPC ........ *B60Q 11/005* (2013.01); *G06K 9/00791* (2013.01); *G06K 9/00825* (2013.01);
(Continued)

(58) Field of Classification Search
CPC .......... B60Q 11/005; B60Q 2300/40–2300/47; G06K 9/00791; G06K 9/00825; G08G 1/0965; G06F 11/3013
See application file for complete search history.

(56) References Cited

U.S. PATENT DOCUMENTS

| 8,946,990 B1 | 2/2015 | Gupta |
| 2002/0154217 A1* | 10/2002 | Ikeda ...................... G01S 11/12 |
| | | 348/148 |

(Continued)

FOREIGN PATENT DOCUMENTS

| DE | 102014014938 A1 | 4/1916 |
| DE | 102016123176 A1 | 5/1918 |

(Continued)

OTHER PUBLICATIONS

Torsten Steiner, Karsten Roscher, Josef Jiru; Cooperative Glare Reduction Using V2V Radio Technology, (Jan. 6, 2014), IEEE Xplore.

(Continued)

*Primary Examiner* — Genna M Mott
(74) *Attorney, Agent, or Firm* — Frank Lollo; Neal, Gerber & Eisenberg LLP; James P. Muraff

(57) ABSTRACT

Method and apparatus are disclosed for camera assisted vehicle lamp diagnosis via vehicle-to-vehicle communication. An example vehicle includes a forward-facing camera and a processor. The processor classifies a target vehicle based on images captured by the camera. Based on the classification, the processor determines locations of lamps on the target vehicle and determines when one of the lamps is not functioning properly. Additionally, when one of the lamps is not functioning properly, the processor sends, via a first communication module, a message to the target vehicle indicating of one of the lamps not functioning properly.

20 Claims, 5 Drawing Sheets

(51) Int. Cl.
 *G08G 1/0965* (2006.01)
 *G07C 5/00* (2006.01)
 *G08G 1/0967* (2006.01)

(52) U.S. Cl.
 CPC ............. *G07C 5/00* (2013.01); *G08G 1/0965* (2013.01); *G08G 1/096791* (2013.01)

(56) References Cited

U.S. PATENT DOCUMENTS

| | | | | |
|---|---|---|---|---|
| 2003/0167123 | A1* | 9/2003 | Nakazawa | G08G 1/166 701/301 |
| 2006/0271275 | A1* | 11/2006 | Verma | G07C 5/0816 701/532 |
| 2008/0122594 | A1 | 1/2008 | Brecht et al. | |
| 2016/0335508 | A1 | 11/2016 | Gor et al. | |
| 2016/0343254 | A1* | 11/2016 | Rovik | B60Q 9/00 |
| 2017/0086277 | A1* | 3/2017 | Kim | H05B 33/0827 |
| 2018/0173953 | A1* | 6/2018 | Ghata | G06K 9/00664 |

FOREIGN PATENT DOCUMENTS

| | | |
|---|---|---|
| EP | 3121762 A1 | 1/1917 |
| EP | 1341140 A1 | 9/2003 |
| EP | 2819870 A2 | 1/2015 |
| JP | 2010137757 A | 6/2010 |
| KR | 20160047724 A | 5/1916 |
| KR | 20130055836 A | 5/2013 |
| KR | 101634451 B1 | 6/2016 |
| WO | WO 2013127674 A2 | 9/2013 |

OTHER PUBLICATIONS

Core System Requirements Specification (SyRS), Jun. 30, 2011, Research and Innovative Technology Administration.
Search Report dated Jul. 18, 2018 for GB Patent Application No. GB 1806511.0 (4 pages).

* cited by examiner

CAMERA ASSISTED VEHICLE LAMP DIAGNOSIS VIA VEHICLE-TO-VEHICLE COMMUNICATION

TECHNICAL FIELD

The present disclosure generally relates to vehicle lamps and, more specifically, camera assisted vehicle lamp diagnosis via vehicle-to-vehicle communication.

BACKGROUND

In the United States, the Dedicated Short Range Communication (DSRC) network is being deployed as a part of the Intelligent Transportation System. DSRC facilitates vehicles communicating with other vehicles to coordinate driving maneuvers and provide warnings about potential road hazards. Additionally, DSRC facilitates communicating with infrastructure-based nodes, such as toll booths and traffic signals. The aim of deploying the DSRC protocol is to reduce fatalities, injuries, property destruction, time lost in traffic, fuel consumption, exhaust gas exposure, among others.

Additionally, a vehicle can be driven when one or more lamps (e.g., head lights, tail lights, etc.) are not functioning without the driver noticing. This is especially an issue with tail lights. Driving with a non-functioning lamp can be dangerous. Additionally, it can lead to police attention and expensive tickets.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for camera assisted vehicle lamp diagnosis via vehicle-to-vehicle communication. An example vehicle includes a camera and a processor. The processor classifies a target vehicle based on images captured by the camera. Based on the classification, the processor determines locations of lamps on the target vehicle and determines when one of the lamps is not functioning properly. Additionally, when one of the lamps is not functioning properly, the processor sends, via a first communication module, a message to the target vehicle indicating of one of the lamps not functioning properly.

An example method includes detecting, with range detection sensors, a target vehicle and classifying the target vehicle based on images captured by a forward-facing camera. The method also includes based on the classification, determining locations of lamps on the target vehicle and calculating illumination values for the lamps on the target vehicle. Additionally, the example method includes determining, based on the illumination values, whether the lamps are not functioning properly. The example method includes, when the lamps are not functioning properly, sending, with a communications module, a message to the target vehicle that causes the target vehicle to provide a warning to a driver.

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
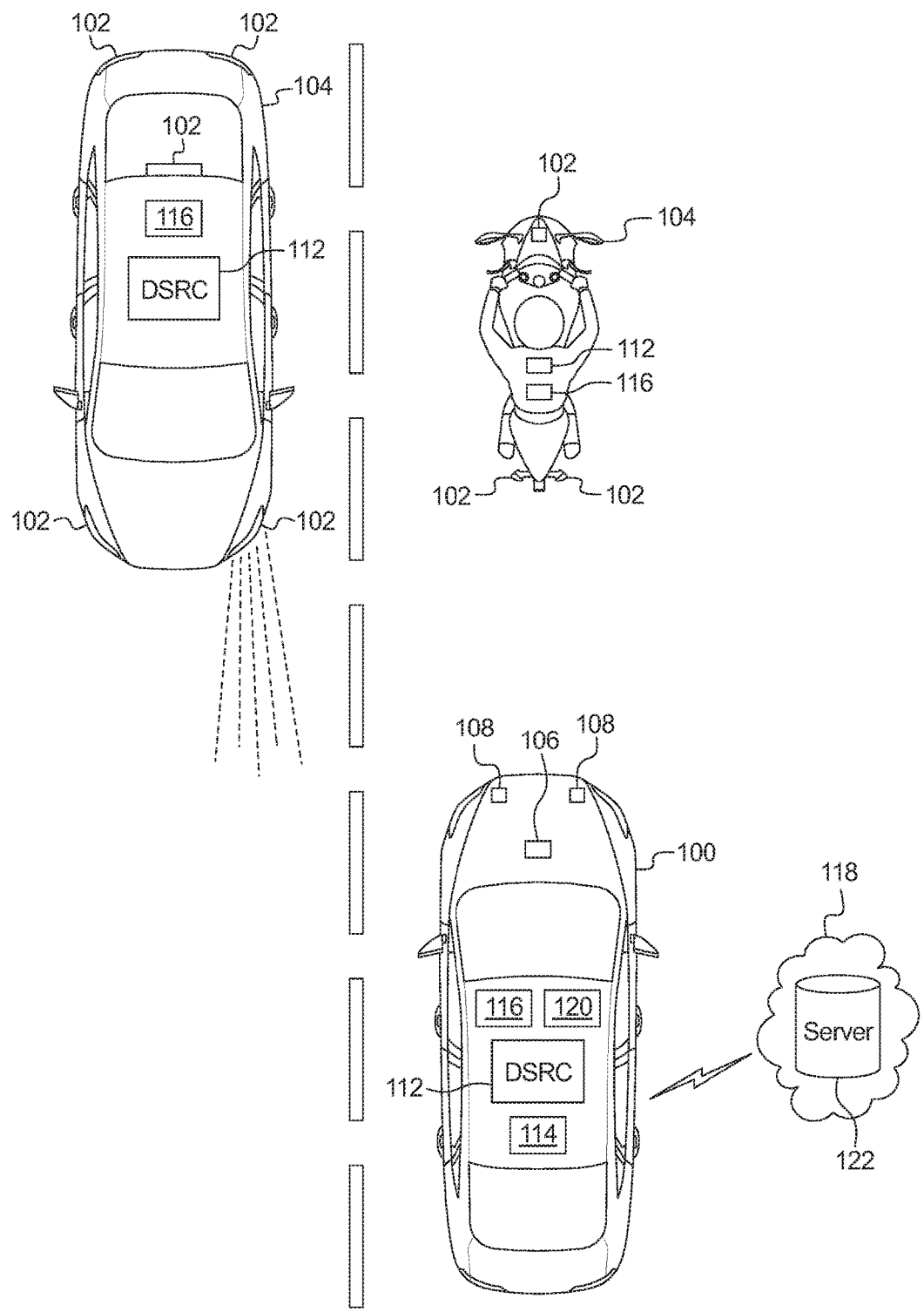
FIG. 1 illustrates a host vehicle diagnosing vehicle lamps of a target vehicle in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

A vehicle uses forward-facing lamps (e.g., headlights, high beam headlights, daytime running lamps (DRLs), and fog lamps, etc.) to both improve the driver's view of the roadway (e.g., after sunset, in tunnels, in inclement weather) and to improve conspicuity of the car to other drivers. DRLs are increasingly common on vehicles. The DRLs are either (a) always on during vehicle operation or (b) on when signaled to be on (e.g., from a roadside unit communicating via vehicle-to-vehicle (V2V) communication). Headlights can be automatically controlled based upon an ambient light sensor or manually controlled by the driver. Fog lamps and high beam headlights are manually controlled.

The vehicle uses rear-facing lamps (e.g., tail lights, brake lights, center high mounted stop lamps (CHMSL), etc.) to improve conspicuity of the car to other drivers and to communicate when the vehicle is decelerating. When the headlights are on (e.g., after sunset, in tunnels, in inclement weather, etc.) the tail lights are also on. The brake lights illuminate when the brake pedal is pressed to decelerate the vehicle. The CHMSL is mounted on the vehicle higher than the brake lights, typically in the rear windshield. The CHMSL is illuminated when the brake pedal is pressed to decelerate the vehicle.

Eventually, the light bulbs or light emitting diodes (LEDs) of the forward-facing and the rear-facing lamps fail as they wear out. Additionally, the lamps may fail more rapidly when they are involved with minor accidents leading directly to light failure or leading to water leaks that accelerate failure. Faults are also caused by faulty light sensors or other electrical failures. When the lamps fail, the driver's view of the roadway is impaired and the vehicle is less visible to other drivers. Not all drivers regularly check that the lamps are working before driving. Some lamps, especially rear-facing lamps, can be difficult to notice when they are not functioning. Additionally, not all vehicles include on-board self-diagnostics to check for malfunctions. As a result, tickets and police interception is common for lamp outages.

As disclosed below, a vehicle (sometimes referred to as a "host vehicle") uses a camera to (i) categorize another vehicle (sometimes referred to as a "target vehicle"), (ii) determine locations of the lamps of interest, (iii) determine an expected amount of illumination, (iv) determine whether the actual amount of illumination matches the expected amount, and (v) send a message to the target vehicle if it does not. Using image recognition, the host vehicle categorizes the vehicle as a sedan, sports utility vehicle (SUV), a truck, a van, or a motorcycle, etc. In some examples, the host vehicle may determine the make and model of the vehicle. Based on the vehicle type of the target vehicle, the host vehicle determines the location(s) of the lamps of interest. For example if the target vehicle is a sedan, the head lights, the high beam lights, and the DRLs may be 2 feet off the surface of a roadway and the fog lamps may be 1.5 feet of the surface of the roadway. In some examples, the size of the defined regions is based on the size of the lamps of interest and the distance between the host vehicle and the target vehicle.

The host vehicle then determines an expected amount of illumination of defined regions around the lamps of interest. The expected illumination is based on the lamp type (e.g., head lights, the high beam lights, the DRLs, fog lamps, etc.), an ambient light, weather, and/or other situational factors. For example, at night, the expected illumination may be a first value, and during the day, the expected illumination may be a second, lower value. The host vehicle measures the actual illumination in the defined regions around the lamps of interest. In some examples, the host vehicle computes an average pixel value within the defined regions around the lamps of interest from an image taken with the camera and compares the average pixel value to a threshold. The threshold value is based on the expected illumination and color of the lamps of interest. For example, the threshold for a head light may be associated with white and the threshold for a tail light may be associated with red.

When the actual illumination does not satisfy the expected illumination, the host vehicle classifies the lighting deficiency. For example, when the ambient light sensor indicates that it is dark and the host vehicle detects that one of the head lights are not functioning on the target vehicle (e.g., the illumination in the defined region corresponding to the head light does not satisfy the threshold), the host vehicle may classify the lighting deficiency as one of the head lamps being damaged. As another example, when the ambient light sensor indicates that it is dark and the host vehicle detects that both of the head lights are not functioning on the target vehicle, the host vehicle may classify the lighting deficiency as the driver forgetting to turn on the head lights. After classifying the lighting deficiency, the host vehicle transmits a message to the target vehicle via vehicle-to-vehicle (V2V) communication. In some examples, the host vehicle indicates the lighting deficiency by manipulating its head lights.

FIG. 1 illustrates a host vehicle 100 diagnosing vehicle lamps 102 of a target vehicle 104 in accordance with the teachings of this disclosure. The host vehicle 100 may be a standard gasoline powered vehicle, a hybrid vehicle, an electric vehicle, a fuel cell vehicle, and/or any other mobility implement type of vehicle. The host vehicle 100 includes parts related to mobility, such as a powertrain with an engine, a transmission, a suspension, a driveshaft, and/or wheels, etc. The host vehicle 100 may be non-autonomous, semi-autonomous (e.g., some routine motive functions controlled by the host vehicle 100), or autonomous (e.g., motive functions are controlled by the host vehicle 100 without direct driver input). In the illustrated example, the host vehicle 100 includes a camera 106, range detection sensors 108, an ambient light sensor 110, a dedicated short range communication (DSRC) module 112, an on-board communications platform 114, and light manager 116.

The camera 106 captures images to be analyzed to (a) detect the target vehicle, (b) determine a distance to the target vehicle 104, (c) determine the type of the target vehicle 104 and/or (d) determine illumination of lamps on the target vehicle. The camera 106 is mounted in any suitable location to record images of the target vehicle 104. The camera 106 may be a forward-facing camera, a rear-view camera, or a 360-degree-view camera, etc. In some examples, when the camera 106 is a forward-facing camera, the camera 106 is mounted on the dashboard of the host vehicle 100. Alternatively or additionally, when the camera 106 is a forward-facing camera, the camera 106 is mounted proximate the license plate holder on the front of the host vehicle 100. One camera 106 shown in the illustrated example of FIG. 1. However, the host vehicle 100 may include multiple cameras 106 to capture image to be analyzed. For example, the host vehicle 100 may include a forward-facing camera and a rear-view camera.

The range detection sensors 108 detect when the target vehicle 104 is within range (e.g., ten feet, twenty feet, etc.) of the host vehicle 100 to analyze the lamps of the target vehicle 104. The range is selected so that the target vehicle is identifiable and/or the define regions (e.g., the defined regions 200 of FIG. 2 below) are large enough to detect the illumination of the lamps 102. The range detection sensors 108 include ultrasonic sensors, RADAR, LiDAR, and/or infrared sensors.

The ambient light sensor 110 measures ambient light in the vicinity of the host vehicle 100. The ambient light sensor 110 may be, for example, embedded in a dashboard or incorporated into a rear-view mirror. The ambient light sensor 110 is used to determine an expected illumination value for lamps 102 of interest. For example, when the ambient light sensor 110 indicates it is bright outside, the expected illumination may be low. As an additional example, when the ambient light sensor 110 indicates that it is dark outside, the expected illumination may be high.

The example DSRC modules 112 include antenna(s), radio(s) and software to broadcast messages and to facilitate communication between the host vehicle 100 and the target vehicle 104, infrastructure-based modules (not shown), and mobile device-based modules (not shown). More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA %20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The on-board communications platform 114 includes wireless network interfaces to enable communication with external networks 118. The on-board communications platform 114 also includes hardware (e.g., processors, memory, storage, antenna, etc.) and software to control the wireless network interfaces. In the illustrated example, the on-board communications platform 114 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); local area wireless network (including IEEE 802.11 a/b/g/n/ac or others), and Wireless Gigabit (IEEE 802.11ad), etc.). In some examples, the on-board communications platform 114 includes a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, the host vehicle 100 may communicated with the external network 118 via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

The light manager 116 diagnoses deficiencies of the lamps 102 of the target vehicle 104. The light manager 116 (i) categorizes the target vehicle 104, (ii) determines locations of the lamps 102 of interest, (iii) determines an expected amount of illumination, (iv) determines whether the actual amount of illumination matches the expected amount, and (v) sends a message indicating the lighting deficiency to the target vehicle 104 if it does not.

To categorize the target vehicle 104, the light manager 116 performs image recognition on an image captured by the camera 106. The target vehicle 104 may be in front of the host vehicle 100 (e.g., when the host vehicle 100 includes a forward-facing camera, etc.) and/or the target vehicle 104 may be behind the host vehicle 100 (e.g., when the host vehicle 100 includes a rear-view camera, etc.) In some examples, the host vehicle 100 includes a vehicle database 120 that includes records for types of vehicles. In such examples, the light manager 116 includes an image recognition technique, such as a neural network, to analyze the image to determine the type of vehicle associated with the target vehicle 104. Alternatively, in some examples, the light manager 116 is communicative coupled, via the on-board communications platform 114, to an image recognition server 122. In such examples, the light manager 116 uploads the image to the image recognition server 122. The image recognition server 122 returns information regarding the type of the target vehicle 104. Alternatively, in some examples, the light manager 116 determines the type of the target vehicle 104 from messages broadcast by the target vehicle 104 via the DSRC module 112. In some examples, the light manager 116 determines the generic type (e.g., sedan, sports utility vehicle (SUV), a truck, a van, or a motorcycle, etc.) of the target vehicle 104. Alternatively or additionally, in some examples, the light manager 116 determines the make and model of the target vehicle 104.

The light manager 116 determines the location(s) of the lamps 102 of interest based on (a) the type of the target vehicle 104, (b) the distance to the target vehicle 104 (e.g., as determined by the range detection sensors 108), and (c) the side (e.g., front or rear) of the target vehicle 104 being viewed. For example, the number and locations of head lights on a sedan are different than the number and location of the headlight of a motorcycle. In some examples, the vehicle database 120 includes information regarding the location of the lamps 102 of interest. Alternatively, in some examples, the image recognition server 122 provides the information regarding the location(s) of the lamps 102 of interest.

The light manager 116 determines an expected amount of illumination of the lamps 102 of interest. The expected illumination is based on the lamp type (e.g., head lights, the high beam lights, the DRLs, fog lamps, etc.), an ambient light, weather, and/or other situational factors. For example, during the day, the illumination value for the head lights may be zero, but the illumination value of the DRLs may be relatively high.

Figure 2:
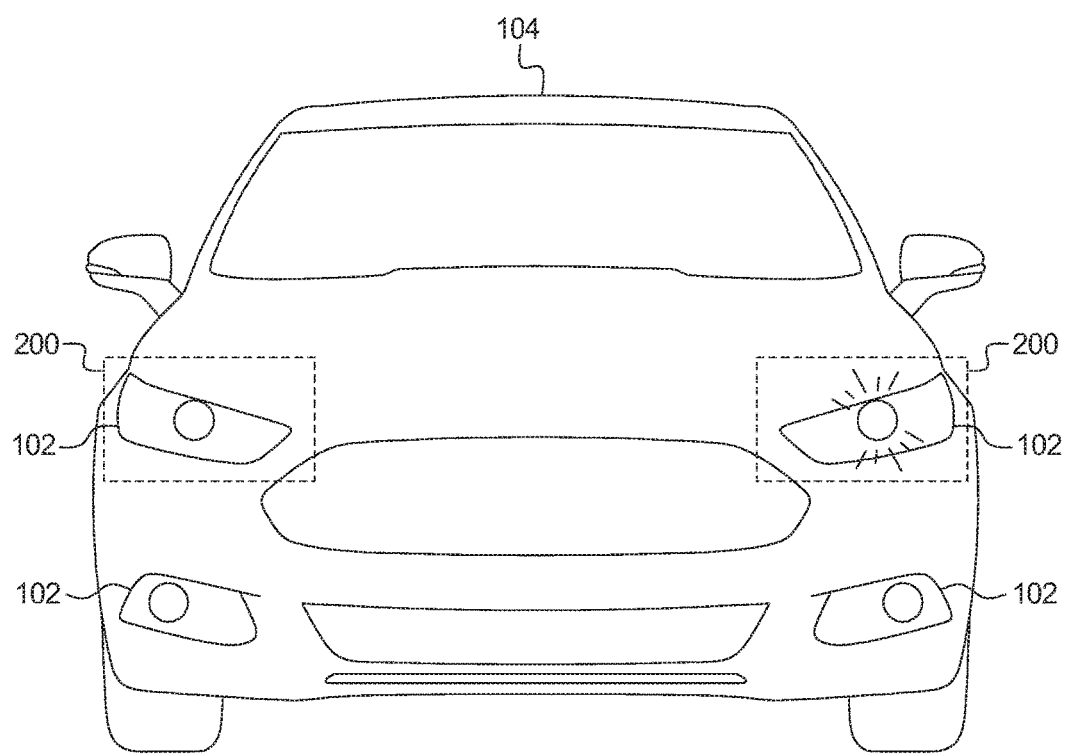
FIG. 2 illustrates a view of the target vehicle from the host vehicle of claim 1.

For each lamp 102 of interest, the light manager 116 determines whether an actual amount of illumination matches the expected amount. As shown in FIG. 2, to measure the actual amount of illumination, the light manager 116 defines regions 200 around the locations of the lamps 102 of interest. The light manager 116 measures the illumination within the regions 200. While in the illustrated example of FIG. 2, the regions 200 are rectangles, the regions 200 may be any suitable shape around the lamps 102 of interest. In some examples, the light manager 116 determines the illumination within the regions 200 by calculating intensity of pixel values in the corresponding regions of the image capture by the camera 106. In some such examples, the light manager 116 calculates an average of the intensity of the pixel values within the region 200. The light manager 116 compares the actual amount of illumination to the expected amount of illumination. In some examples, the light manager 116 compares the average of the intensity of the pixel values within the region 200 to a threshold. When the actual amount of illumination satisfies the threshold, the light manager 116 determines that the corresponding lamp 102 is functioning properly. Otherwise, then the actual amount of illumination does not satisfy the threshold, the light manager 116 determines that the corresponding lamp 102 is not functioning properly.

In some examples, the light manager 116 compares the actual amount of illumination from the lamps 102 of interest to a secondary threshold higher than the primary threshold. The secondary threshold is defined to differentiate between the head lights and the high beam lights. For example, at night, the light manager 116 may determine whether the head lights are illuminated or if the high beam lights are illuminated. In some examples, the light manager 116 determines that the high beam lights are illuminated when the actual amount of illumination from the lamps 102 of interest exceeds the secondary threshold.

When actual amount of illumination is close (e.g., satisfies the primary and/or secondary threshold, etc.) to the expected amount of illumination, the light manager 116 determines a type of lighting deficiency and sends a message to the target vehicle 104. In some examples, the light deficiencies are dependent on factors sensed by the range detection sensors 108 and/or the ambient light sensor 110 and/or received from an external source, such as a road side unit (not shown). In some examples, the light deficiency is determined by Table (1) below.

TABLE 1

EXAMPLE LIGHT DEFICIENCIES

| Lamp Issue | Factors | Inferred Problem | Action |
|---|---|---|---|
| No Head Lights or no tail lights | Night | Driver forgot to turn on head lights | Send message to notify target vehicle to turn on head lights |
| Only DRLs and/or Fog Lamps | Night | Driver forgot to turn on head lights | Send message to notify target vehicle to turn on head lights |
| Only one tail light or only one head light | Night | One of the head lights or tail lights is not functioning properly | Send message to target vehicle to notify of malfunctioning light |
| One or more DRLs not illuminated | Region where DRLs are required by law | DRLs are not functioning properly | Send message to target vehicle to notify of malfunctioning DRLs |
| High Beam lights on | Target vehicle is traveling in opposite lane | Driver forgot to turn off high beams near oncoming traffic | Send message to target vehicle requesting that the driver turn off high beam lights |
| No CHMSL | Vehicle has CHMSL and Detect that target vehicle is decelerating | CHMSL is not functioning properly | Send message to target vehicle to notify of malfunctioning CHMSL |
| Less than two brake lights | Detect that target vehicle is decelerating | Brake lights are not functioning properly | Send message to target vehicle to notify of malfunctioning brake lights |

When one of the light deficiencies is detected, the light manager 116 takes an action. The light manager 116 sends a message to the target vehicle 104 via the DSRC module 112. For example, if the light manager 116 determines that one or more DRLs of the target vehicle 104 are not illuminated, the light manager 116 may send a message via the DSRC module 112 to notify the driver of the malfunctioning DRLs. In some examples, the light manager 116 also instructs a body control module (not shown) to flash the head lights of the host vehicle 100 to notify the other driver of the detected light deficiency.

In the illustrated example, the target vehicle 104 also includes the light manager 116. When the light manager 116 of the target vehicle 104 receives the message from the host vehicle 100 via the DSRC module 112, the light manager 116 displays an alert to the driver of the target vehicle 104 via an infotainment head unit (e.g., the infotainment head unit 302 of FIG. 3 below).

Figure 3:
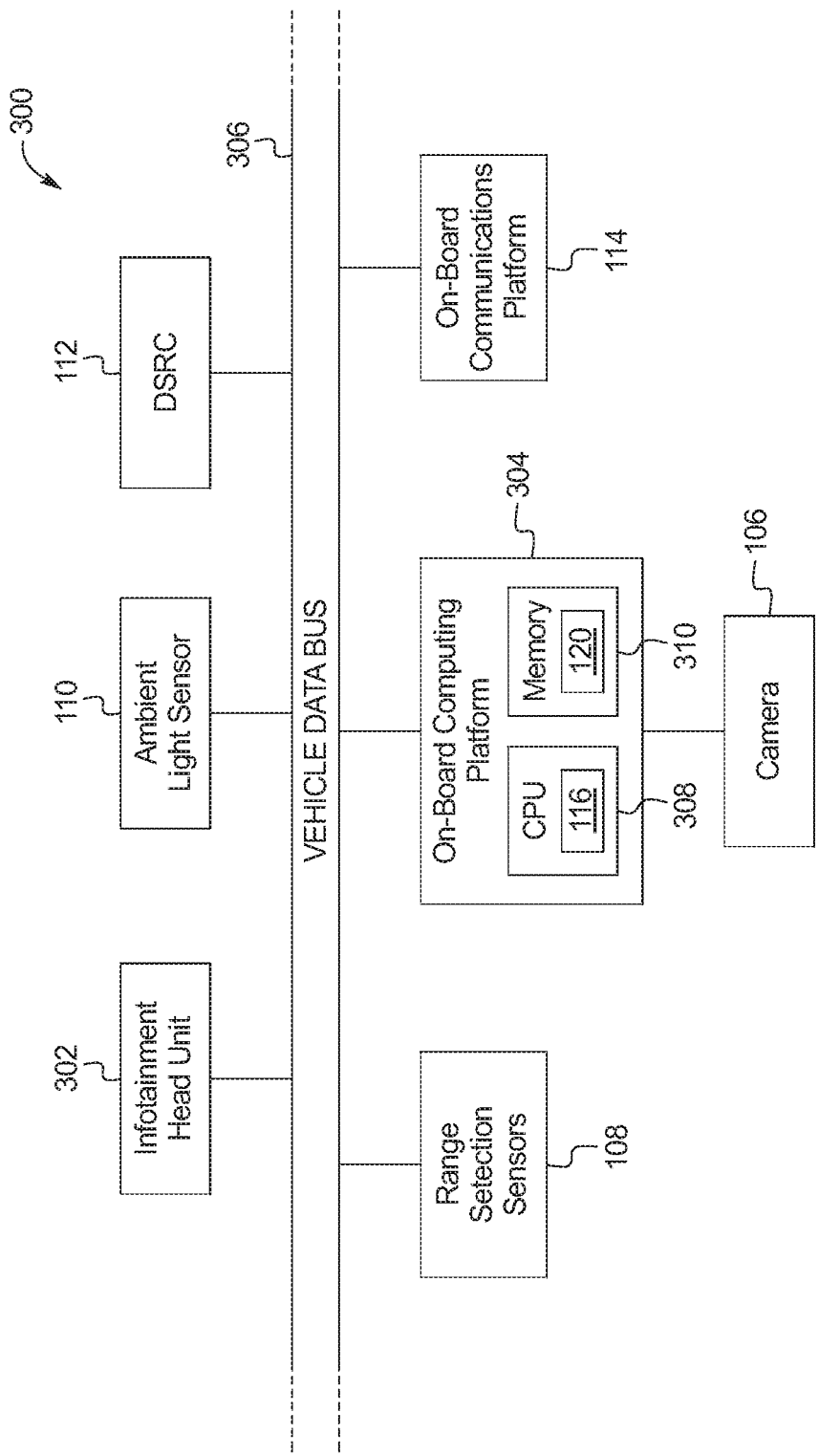
FIG. 3 is a block diagram of electronic components of the host vehicle of FIG. 1.

FIG. 3 is a block diagram of electronic components 300 of the host vehicle of FIG. 1. In the illustrated example, the electronic components 300 include the camera 106, the range detection sensors 108, the ambient light sensor 110, the DSRC module 112, the on-board communications platform 114, an infotainment head unit 302, an on-board computing platform 304, and a vehicle data bus 306.

The infotainment head unit 302 provides an interface between the vehicles 100 and 104 and a user. The infotainment head unit 302 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 302 includes hardware (e.g., a processor or controller, memory, storage, etc.) and software (e.g., an operating system, etc.) for an infotainment system ZZZ (such as SYNC® and MyFord Touch® by Ford®, Entune® by Toyota®, IntelliLink® by GMC®, etc.). Additionally, the infotainment head unit 302 displays the infotainment system on, for example, the center console display.

The on-board computing platform 304 includes a processor or controller 308 and memory 310. In the illustrated example, the on-board computing platform 304 is structured to include light manager 116. Alternatively, in some examples, the light manager 116 may be incorporated into another electronic control unit (ECU) with its own processor and memory, such as the body control module. The processor or controller 308 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 310 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 310 includes multiple kinds of memory, particularly volatile memory and non-volatile memory.

The memory 310 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 310, the computer readable medium, and/or within the processor 308 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 306 communicatively couples the range detection sensors 108, the ambient light sensor 110, the DSRC module 112, the on-board communications platform 114, the infotainment head unit 302, and/or the on-board computing platform 304. In some examples, the vehicle data bus 306 includes one or more data buses. The vehicle data bus 306 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
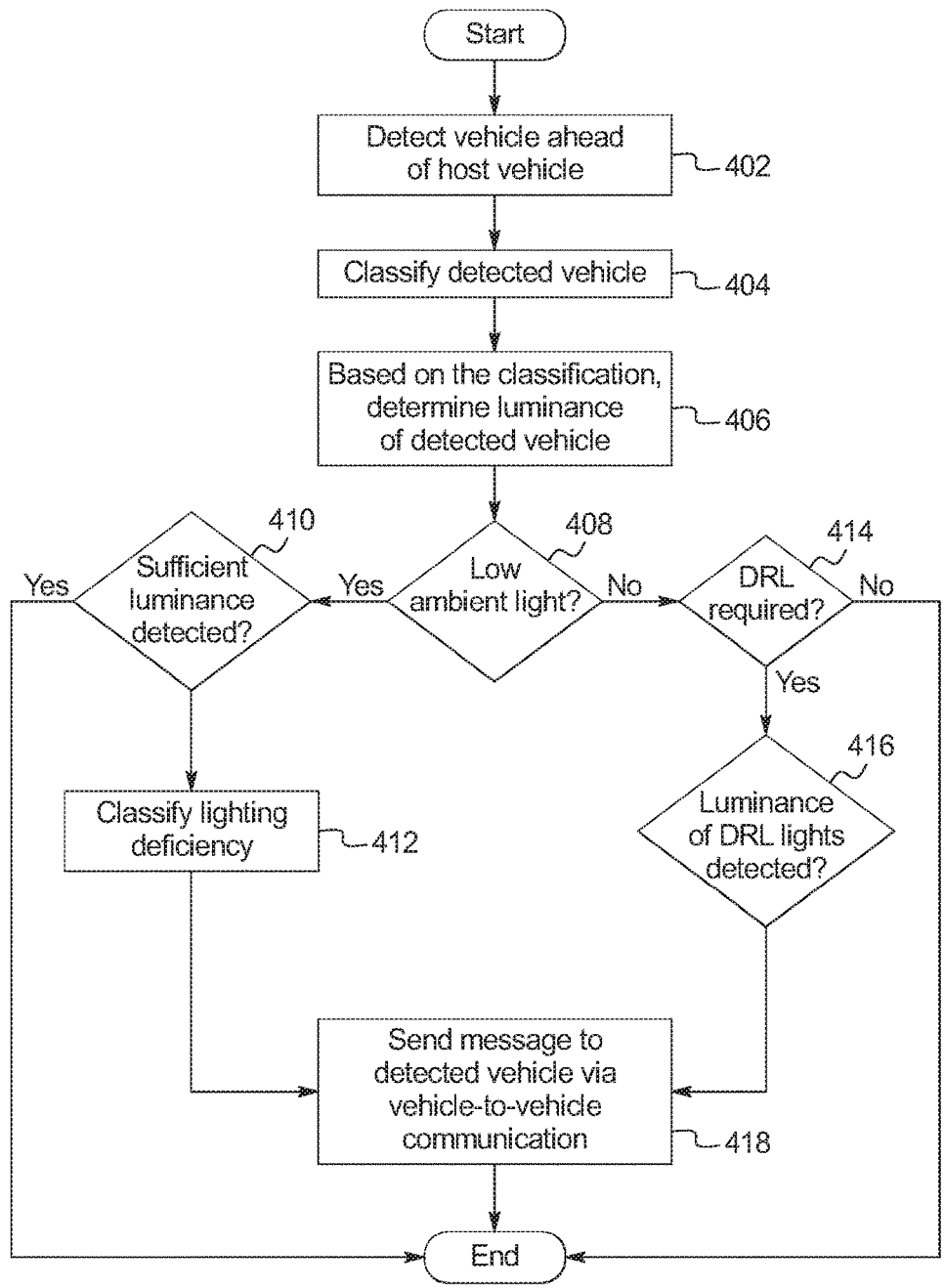
FIG. 4 is a flowchart of a method to diagnose lamps of the target vehicle of FIGS. 1 and 2, which may be implemented by the electronic components of FIG. 3.

FIG. 4 is a flowchart of a method to diagnose the lamps 102 of the target vehicle 104 of FIGS. 1 and 2, which may be implemented by the electronic components 300 of FIG. 3. Initially, at block 402, the light manager 116 detects the target vehicle 104 near the host vehicle 100. For example, when the host vehicle 100 includes a front-facing camera, the light manager 116 may detect the target vehicle 104 ahead of the host vehicle 100. As another example, when the host vehicle 100 includes a rear-view camera, the light manager 116 may detect the target vehicle 104 behind the host vehicle 100. The detected target vehicle 104 may be traveling in the same direction or in the opposite direction of the host vehicle 100. The light manager 116 detects the target vehicle 104 with the camera 106 and/or the range detection sensors 108. At block 404, the light manager 116 classified the detected target vehicle 104 based on one or more images captured by the camera 106. At block 406, the light manager 116 determines the illumination of the lamps 102 of interest of the detected target vehicle 104. At block 408, the light manager 116 determines whether the ambient light is low (e.g., the ambient light is indicative of the time being after sunset or indicative of the vehicles 100 and 104 being in a tunnel, etc.). In some examples, the light manager 116 determines the ambient light level based on the ambient light sensor 110. Alternatively or additionally, the light manager 116 determines the ambient light level based on information received from a server via the on-board communications platform 114. When the ambient light is low, the method continues at block 410. Otherwise, when the ambient light is not low, the method continues at block 416.

At block 410, the light manager 116 determines if the actual illumination of the lamps(s) 102 of interest satisfies a threshold based on the expected illumination of the lamps(s) 102 of interest. When the actual illumination of the lamps(s) 102 of interest does not satisfy the threshold based on the expected illumination of the lamps(s) 102 of interest, at block 412, the light manager 116 classifies the lighting deficiency. Examples of lighting deficiencies are provided on Table (1) above. At block 414, the light manager 116 sends a message to the target vehicle 104 via the DSRC module 112 to notify the driver of the light deficiency.

At block 416, the light manager 116 determines whether the DRLs are required. In some example, the light manager 116 determines whether the DRLs are required based on (a) information received from roadside unit, (b) information received from a server, and/or (c) whether the host vehicle 100 includes DRLs. When DRLs are required, at block 418, the light manager 116 determines whether the DRLs of the target vehicle 104 are detected. When the DRLs of the target vehicle 104 are not detected, at block 414, the light manager 116 sends a message to the target vehicle 104 via the DSRC module 112 to notify the driver of the light deficiency.

Figure 5:
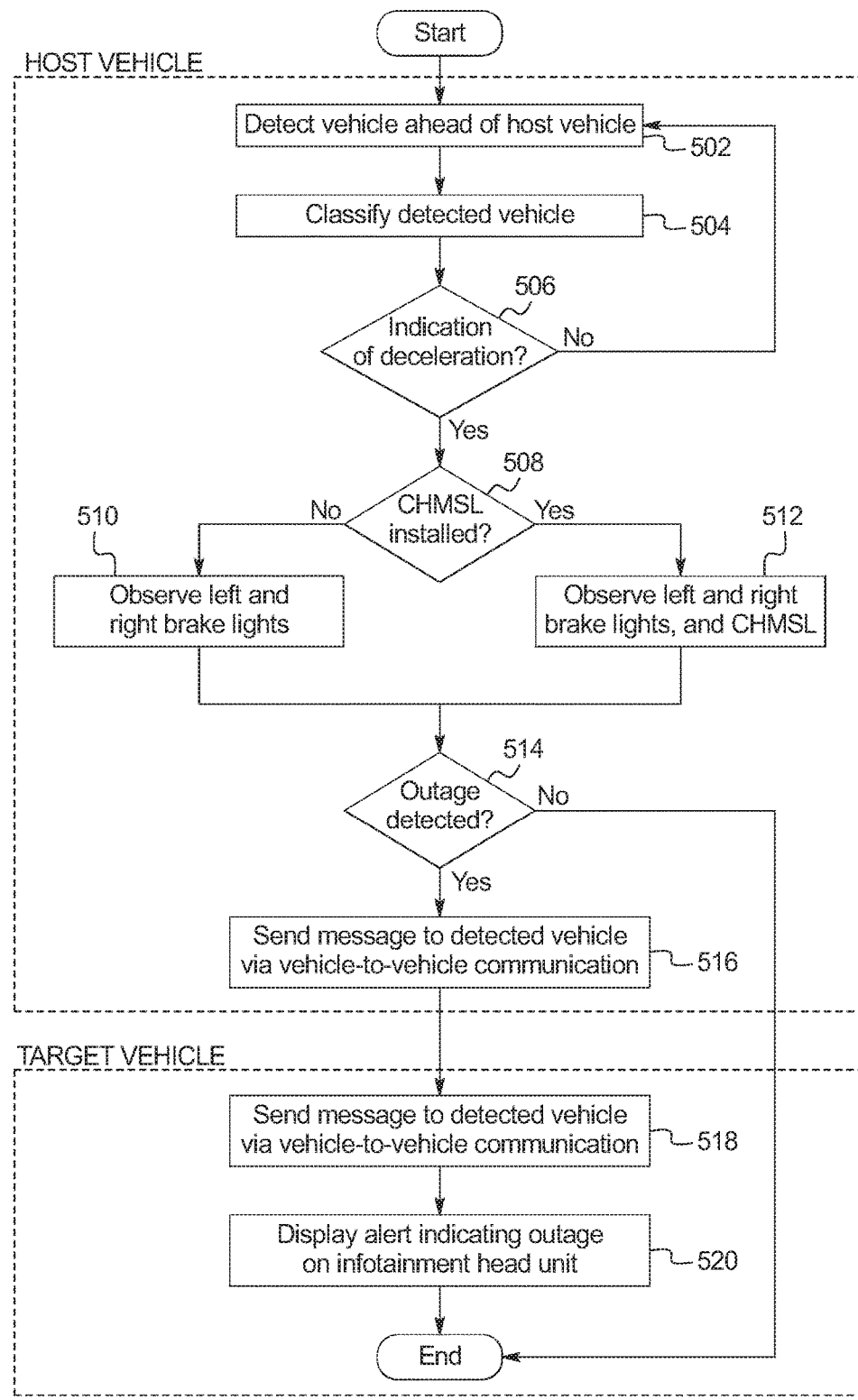
FIG. 5 is a flowchart of a method to diagnose tail lights and notify the target vehicle via vehicle-to-vehicle communication, which may be implemented by the electronic components of FIG. 3.

FIG. 5 is a flowchart of a method to diagnose tail lights and notify the target vehicle 104 via vehicle-to-vehicle communication, which may be implemented by the electronic components 300 of FIG. 3. Initially, at block 502, the light manager 116 of the host vehicle 100 detects the target vehicle 104 ahead of the host vehicle 100 in the same direction of travel as the host vehicle 100. The light manage 116 detects the target vehicle 104 with the camera 106 and/or the range detection sensors 108. At block 504, the light manager 116 classified the detected target vehicle 104 based on one or more images captured by the camera 106. At block 506, the light manager 116 determines whether the target vehicle 104 is decelerating. The light manager 116 determines the acceleration/deceleration of the target vehicle 104 via the range detection sensors 108. When the light manager 116 detects deceleration, the method continues to block 508. Otherwise, when the light manager 116 does not detect deceleration, the method returns to block 502.

At block 508, based on the type of the target vehicle 104 classified at block 504, the light manager 116 determines whether the target vehicle 104 includes the CHMSL. When the target vehicle 104 includes the CHMSL, the method continues at block 510. Otherwise, if the target vehicle 104 does not include the CHMSL, the method continues at block 512. At block 510, the light manager 116 determines whether the actual illuminations of the tail lights and the CHMSL satisfy a threshold based on the expected illuminations of the tail lights and the CHMSL. At block 512, the light manager 116 determines whether the actual illuminations of the tail lights satisfy a threshold based on the expected illuminations of the tail lights.

At block 514, the light manager 116 determines whether any of the tail lights and/or CHMSL are not functioning properly. When any of the tail lights and/or CHMSL are not functioning properly, at block 516, the light manager 116 sends a message to the target vehicle 104 via the DSRC module 112 to notify the driver of the light deficiency.

At block 518, the light manager 116 of the target vehicle 104 receives the message from the host vehicle 100 via the DSRC module 112. At block 520, the light manager 116 displays the alert indicating the lighting deficiency on the infotainment head unit 302.

The flowcharts of FIGS. 4 and 5 are representative of machine readable instructions stored in memory (such as the memory 310 of FIG. 3) that comprise one or more programs that, when executed by a processor (such as the processor 308 of FIG. 3), cause the vehicles 100 and 104 to implement the example light manager 116 of FIGS. 1 and 3. Further, although the example program(s) is/are described with reference to the flowcharts illustrated in FIGS. 4 and 5, many other methods of implementing the example light manager 116 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a camera;
   a first communication module; and
   a processor to:
   classify a make and model of a target vehicle based on images captured by the camera;
   based on the make and model, determine locations of lamps on the target vehicle;
   determine when one of the lamps is not functioning properly; and
   when one of the lamps is not functioning properly, send, via the first communication module, an alert to the target vehicle.

2. The vehicle of claim 1, including an ambient light sensor, and wherein to determine when one of the lamps is not functioning properly, the processor is configured to determine an expected illumination value for each of the lamps based on an ambient light measurement from the ambient light sensor.

3. The vehicle of claim 2, wherein to determine when one of the lamps is not functioning properly, the processor is configured to measure an actual illumination value for each of the lamps based on the images captured by the camera.

4. The vehicle of claim 1, including a second communication module, and wherein to determine the make and model of the target vehicle based on the images captured by the camera, the processor is configured to upload the images to an image recognition server via the second communication module.

5. The vehicle of claim 4, wherein the processor is configured to receive, via the second communication module, the make and model of the target vehicle from the image recognition server.

6. The vehicle of claim 1, including onboard memory with a database that associates the make and model of the target vehicle with the locations of the lamps of the target vehicle.

7. The vehicle of claim 1, wherein the processor is configured to determine when high beam lamps of the target vehicle are activated.

8. The vehicle of claim 7, wherein, responsive to determining that the high beam lamps of the target vehicle are activated and the target vehicle is traveling in an opposite direction as the vehicle, the processor is configured to send, via the first communication module, a message to the target vehicle requesting the high beam lamps be deactivated.

9. The vehicle of claim 1, wherein the processor is configured to utilize image recognition to determine the make and model based on the images captured by the camera.

10. The vehicle of claim 9, further including onboard memory with a database that associates makes and models of vehicles with lamp locations of the vehicles, wherein the processor is configured to access the database to determine the locations of the lamps of the target vehicle based on the make and model of the target vehicle.

11. The vehicle of claim 1, wherein the processor is configured to determine the make and model of the target vehicle further based upon communication between the first communication module and the target vehicle.

12. A method for a host vehicle comprising:
    detecting, with range detection sensors, a target vehicle;
    classifying, with a processor, a make and model of the target vehicle based on images captured by a camera;
    based on the make and model, determining locations of lamps on the target vehicle;
    calculating illumination values for the lamps on the target vehicle;
    determining, based on the illumination values, whether the lamps are not functioning properly; and
    responsive to determining that the lamps are not functioning properly, sending, with a communications module, a message to the target vehicle that causes the target vehicle to provide a warning to a driver.

13. The method of claim 12, wherein determining whether the lamps are not functioning properly includes determining, with an ambient light sensor, whether area around the host vehicle is dark.

14. The method of claim 13, wherein determining whether the lamps are not functioning properly includes, when the area around the host vehicle is dark, determining whether one of a set of head lights of the target vehicle is not functioning properly.

15. The method of claim 14, wherein, responsive to determining that one of the set of head lights of the target vehicle is not functioning properly, the message indicates that the one of the set of head lights is malfunctioning.

16. The method of claim 13, wherein determining whether the lamps are not functioning properly includes, when the area around the host vehicle is dark, determining whether all of the head lights of the target vehicle are not functioning properly.

17. The method of claim 16, wherein, responsive to determining that all of the head lights of the target vehicle are not functioning properly, the message indicates that the driver of the target vehicle forgot to turn on the head lights.

18. The method of claim 13, wherein determining whether the lamps are not functioning properly includes, when the area around the host vehicle is not dark, determining whether daylight running lights are required by law.

19. The method of claim 18, wherein, responsive to determining that the daylight running lights are required by law, determining, based on the images captured by the camera, whether the daylight running lights of the target vehicle are illuminated.

20. The method of claim 19, wherein, responsive to determining that the daylight running lights of the target vehicle are not illuminated, the message indicates that the daylight running lights of the target vehicle are malfunctioning.

\* \* \* \* \*